US009098983B2

(12) United States Patent
Rahilly

(10) Patent No.: US 9,098,983 B2
(45) Date of Patent: Aug. 4, 2015

(54) SINGLE-ITEM-ACCESS DRAWER

(75) Inventor: Michael Rahilly, Encinitas, CA (US)

(73) Assignee: CAREFUSION 303, INC., San Diego, CA (US)

( * ) Notice: Subject to any disclaimer, the term of this patent is extended or adjusted under 35 U.S.C. 154(b) by 105 days.

(21) Appl. No.: 13/482,935

(22) Filed: May 29, 2012

(65) Prior Publication Data

US 2013/0320820 A1 Dec. 5, 2013

(51) Int. Cl.

| | |
|---|---|
| ***G06F 17/00*** | (2006.01) |
| ***A47B 81/00*** | (2006.01) |
| ***A47B 88/20*** | (2006.01) |
| ***G07F 11/62*** | (2006.01) |
| ***E05B 65/46*** | (2006.01) |
| ***G07F 11/18*** | (2006.01) |
| ***G07F 17/00*** | (2006.01) |
| ***A61J 7/00*** | (2006.01) |
| ***E05B 47/00*** | (2006.01) |

(52) U.S. Cl.

CPC ............... *G07F 11/62* (2013.01); *A61J 7/0069* (2013.01); *E05B 47/00* (2013.01); *E05B 65/46* (2013.01); *G07F 11/18* (2013.01); *G07F 17/0092* (2013.01)

(58) Field of Classification Search

CPC ..... E05B 65/468; E05B 65/465; G07F 11/50; G07F 11/18

See application file for complete search history.

(56) References Cited

U.S. PATENT DOCUMENTS 5,883,806 A 3/1999 Meador et al.
6,011,999 A * 1/2000 Holmes ......................... 700/231
6,065,819 A * 5/2000 Holmes et al. ................ 312/215
6,338,007 B1 * 1/2002 Broadfield et al. ........... 700/231
7,040,504 B2 * 5/2006 Broadfield et al. ............. 221/98
7,426,425 B2 * 9/2008 Meek et al. .................... 700/237
7,747,347 B2 * 6/2010 Park, IV ......................... 700/243
7,909,418 B2 * 3/2011 McFarland ..................... 312/215
7,952,315 B2 * 5/2011 Park, IV ......................... 318/578
7,992,746 B2 * 8/2011 Weber ........................... 221/125
8,090,473 B2 * 1/2012 Higham ......................... 700/242
8,332,066 B2 * 12/2012 Weber ........................... 700/242
8,335,588 B2 * 12/2012 Rahilly et al. ................ 700/242
8,457,784 B2 * 6/2013 Rahilly et al. ................ 700/242
8,517,215 B2 * 8/2013 Shafir ........................... 221/152
8,635,868 B2 * 1/2014 Weber et al. ..................... 60/528
8,706,294 B2 * 4/2014 Rahilly et al. ................ 700/242

(Continued)

FOREIGN PATENT DOCUMENTS

EP 2312099 4/2011
WO WO 99/30248 6/1999

OTHER PUBLICATIONS

International Search Report and Written Opinion for PCT/US2013/042524 mailed Nov. 12, 2013.

*Primary Examiner* — Michael K Collins

(74) *Attorney, Agent, or Firm* — McDermott Will & Emery LLP

(57) ABSTRACT

A single-item-access (SIA) sub-drawer is disclosed that has a body with a compartment and a lid that is selectably securable in a closed position that encloses the compartment. The SIA sub-drawer includes a lid latch configured to secure and selectably release the lid and a sub-drawer latch configured to engage and selectably release a retention hook to secure the SIA sub-drawer to a dispensing cabinet. The SIA sub-drawer also includes a processor configured to cause the lid latch to release the lid upon receipt of a lid release signal and to cause the sub-drawer latch to release the retention hook upon receipt of a sub-drawer release signal.

19 Claims, 5 Drawing Sheets

(56) References Cited

U.S. PATENT DOCUMENTS

| | | | | |
|---|---|---|---|---|
| 2004/0108795 | A1 | 6/2004 | Meek, Jr. et al. | |
| 2005/0113970 | A1 | 5/2005 | Holmes et al. | |
| 2007/0078562 | A1 * | 4/2007 | Park, IV | 700/243 |
| 2009/0224638 | A1 | 9/2009 | Weber | |
| 2011/0012491 | A1 | 1/2011 | Rahilly | |
| 2012/0004772 | A1 | 1/2012 | Rahilly et al. | |
| 2012/0187143 | A1 * | 7/2012 | Weber et al. | 221/112 |
| 2012/0187144 | A1 * | 7/2012 | Weber et al. | 221/124 |
| 2012/0239186 | A1 * | 9/2012 | Kim | 700/232 |
| 2013/0320820 | A1 * | 12/2013 | Rahilly, Michael | 312/209 |
| 2014/0144925 | A1 * | 5/2014 | Weber et al. | 221/154 |

* cited by examiner

SINGLE-ITEM-ACCESS DRAWER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field

The present invention generally relates to secure, portable containers and, in particular, a dockable multi-compartment sub-drawer with latching lids.

2. Description of the Related Art

Hospitals often manage the storage and dispensing of medications for patients using an Automated Dispensing Machine (ADM). The ADM usually resides near or at the nursing station and contains items that cover the needs of the patients in a designated area within the hospital.

A common problem of ADMs is that the nurse must make several trips between the bedside of a patient and the ADM in the course of caring for a patient. The nurse first must travel from her current location, often the nursing station, to the patient to determine the patient's needs. When a medication is required, the nurse must then travel back to the nursing station and log into the ADM and identify the desired medication, whereupon the ADM dispenses the medication to the nurse. The nurse then must travel back to the patient to administer the medication, after which the nurse returns to the nursing station or other activity.

Another problem of ADMs is that a single ADM cannot contain every medication used by the hospital. Some medications are used so infrequently that a dose of the medication in a typical ADM would likely expire prior to being required for a patient. Some medications are expensive and hospitals cannot afford to stock these medications in locations where it is not currently prescribed to a patient. When one of these medications is newly prescribed, a pharmacist or pharmacy technician must carry the newly prescribed medication to the ADM nearest to the patient and load the medication into the ADM. This often requires removal of a different medication from the ADM to provide space for the new medication.

One current system for securely transporting medications includes single-compartment receptacles having a latching lid that are secure during transport and can be opened only when docked to an appropriate docking station. Such a transportable receptacle is disclosed in U.S. Pat. No. 6,116,461 to Broadfield et al., which is hereby incorporated herein by reference. U.S. Pat. No. 6,116,461 discloses that the pharmacy uses a docking station to open the receptacle and load one or more doses of a medication into the receptacle. The receptacle is then transported to an ADM that is equipped with a drawer having docking stations and the receptacle is placed in one of the drawer's docking stations. The medications in the receptacle are then available to be dispensed to the nurses at the ADM. One potential drawback with this system is that each receptacle contains a single medication, whereas a typical patient in a hospital may be receiving a dozen or more medications.

SUMMARY

It is desirable to provide a system and method of providing multiple patient-specific medications in a manner that the medications can be stored and dispensed in the patient's room or, if stored in an ADM, efficiently moved from one ADM to another when the patient is moved from one care area to another. It is also desirable to provide single-dose storage of medications to reduce the time that it takes to dispense a medication.

In certain aspects, a single-item access (SIA) sub-drawer is disclosed that includes a body comprising at least one fixed internal wall that divides the body into a plurality of compartments and a plurality of lids coupled to the body so as to respectively enclose the plurality of compartments. Each lid has a closed position and a lid hook. The SIA sub-drawer also includes a plurality of lid latches coupled to the body and configured to respectively engage the lid hook of one of the plurality of lids when the lid is in the closed position, a sub drawer latch coupled to the body and configured to engage a retention hook of an external system, a communication interface configured to communicate with an external device, and a processor coupled to the plurality of lid latches, the sub-drawer latch, and the communication interface. The processor is configured to receive signals from the external device through the communication interface, cause a selectable one of the plurality of lid latches to release the respective lid hook upon receipt of a lid-release signal, and cause the sub-drawer latch to release the retention hook upon receipt of a sub-drawer release signal.

In certain aspects, a point-of-care (POC) system is disclosed that includes a dispensing cabinet (DC) and a SIA sub-drawer. The DC includes a housing with a containment pocket and a retention hook and a first processor disposed within the housing. The POC system also includes a SIA sub drawer having a body configured to be secured within the containment pocket wherein the body comprising a compartment, a lid coupled to the body wherein the lid is selectably securable in a closed position that encloses the compartment, a lid latch coupled to the body and configured to secure the lid, a sub-drawer latch coupled to the body and configured to engage and selectably release a retention hook, and a second processor coupled to the lid latch and the sub-drawer latch. The second processor is configured to cause the sub-drawer latch to release the retention hook upon receipt of a sub-drawer release signal from the first processor.

In certain aspects, a method of providing patient-specific medications is disclosed. The method includes the step of docking a SIA sub-drawer onto a loading station wherein the SIA sub-drawer includes a body comprising a compartment, a lid coupled to the body and selectably securable in a closed position that encloses the compartment, a lid latch coupled to the body and configured to secure the lid, a sub-drawer latch coupled to the body and configured to engage and selectably release a retention hook, and a processor coupled to the lid latch and the sub-drawer latch wherein the processor is configured to cause the lid latch to release lid upon receipt of a lid release signal. The method also includes the steps of providing a lid-release signal to the processor to thereby release the lid and thereby allow access to the compartment, loading at least one dose of a medication prescribed for a specified patient into the compartment, closing the lid, removing the SIA sub-drawer from the loading station, transporting the SIA sub-drawer to a DC that is located at a POC for the specified patient wherein the DC has a containment pocket and a retention hook, and loading the SIA sub-drawer into the containment pocket such that the sub-drawer latch engages the retention hook of the DC.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
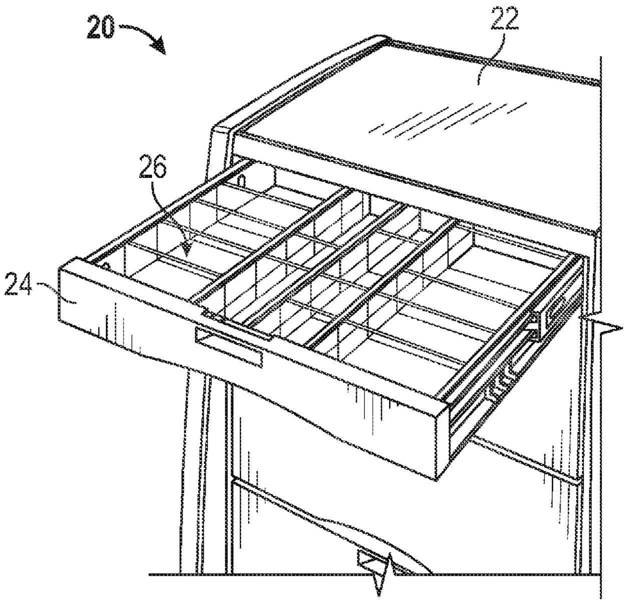
FIG. 1 (Prior Art)
FIG. 1 depicts a portion of a conventional dispensing cart used to move medications and supplies to the patients' rooms.

The following description discloses embodiments of a patient-specific dispensing system that includes a DC and multi-compartment sub-drawers containing medications for a specific patient. In certain embodiments, the DC is mounted on the wall of the specific patient's room. In some embodiments, each compartment of the sub-drawer contains a single dose of a medication. However, although described in the context of a patient room, the embodiments of the present disclosure may also be located in other areas besides a patient room.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

As used within this disclosure, the term "hook" is defined as a retention feature having a capture surface configured to be engaged by a latching element. The retention feature may be configured with an open capture surface such as a ledge or knob or a closed feature such as a pocket or loop. Any feature that can be captured and retained and then selectably released by a second feature falls within the scope of this term.

As used within this disclosure, the term "spring" is defined as any element that creates a resisting force when deformed in a first direction, wherein the resisting force is applied in a second direction opposite to the first direction. Examples of springs include blocks of a compressible elastic material, bands of a stretchable elastic material, plastic cantilevers, and metal coils.

As used within this disclosure, the term "latch" is defined as any device wherein a first part is caused to move with respect to a second part by the application of electricity. As an example, the first part may be a shaft or rotor and the second part may be a housing or stator. Another example is a solenoid where the first part is the moving core and the second part is the stationary coil. The latch may include other mechanisms or elements that are coupled to one or both of the first and second parts. These other elements may selectively engage and disengage hooks or other retention features by movement of the one of the first and second parts. The force between the first and second parts may be created by interaction of one or more of permanent magnets, metallic elements, and electrical circuits. A latch may include electrical components that control the flow of electricity through one or more portions of the motor, including one or more of a switch such as a transistor, a sensing element such as a Hall effect sensor, a control element such as a processor, and a signal handling device such as a transceiver. A latch may include digital electronics to accept commands and provide signals to other electronics.

As used within this disclosure, the term "point-of-care" or "POC" is defined as any location where care is being administered. While the embodiments of the present disclosure describe a patient's room in a hospital as the POC, other locations such as a treatment area of an oncology department or a patient's home are included within the scope of a POC.

As used within this disclosure, the term "dispensing cabinet" or "DC" is defined as any device that provides a containment pocket adapted to securely receive a SIA sub-drawer. While the embodiments of the present disclosure describe a wall-mounted DC, other types of devices such as a cabinet anchored to a countertop or a cabinet anchored to a mobile cart are included within the scope of a DC.

As used within this disclosure, the term "motor" is defined as a device that causes motion in response to the provision of electrical energy. Non-limiting examples of motors include a linear solenoid, a shape-memory alloy or "muscle" wire, and a rotational drive that may include one or more of conductive coils and permanent magnets. A motor may also include active or passive elements that control or modulate the provided electrical energy, for example switches, filters, and processors.

FIG. 1 depicts a portion of a conventional dispensing cart 20 used to move medications and supplies to the patients' rooms. A cart 20 may be loaded with all of the medications prescribed for a group of patients and then the cart 20 will be moved from room to room as a nurse conducts a medication administration round for that group of patients so as to have all of the medications available at or near the point-of-care. The cart 20 typically has a number of drawers 24 mounted in a closed housing 22. Each compartment 26 in the drawer 24 may contain a different medication. The drawers 24 themselves can often be locked closed but once the drawer 24 is opened, the entire contents of the drawer 24 are available. The medications prescribed for different patients may be kept in separate drawers 24 or may be kept in a common drawer 24. A cart 20 of this type does not typically provide the access control and tracking of medication dispensing that is desirable.

In an ideal healthcare setting, all of the medications that a particular patient might require are available at the patient's bedside so that a nurse can assess the condition of the patient, obtain a medication appropriate to treat the patient's condition, and administer the medication to the patient without leaving the bedside. Being able to complete the care-giving task in a minimum amount of time and without interruptions improves the care provided to the patient and reduces both the stress and workload of the nurse. At the same time, security is important to prevent patient self-administration and potential theft, thus access to the medications must be secure. Previous attempts to provide patient-specific medications at the bedside have suffered from complexity and an excessive amount of work required to deliver multiple medications and then remove them when no longer needed for a specific patient. The SIA sub-drawer disclosed herein provides the ability to deliver and remove multiple medications in a single container and further can provide single-dose access to further reduce the workload of the nurse and pharmacists.

Figure 2:
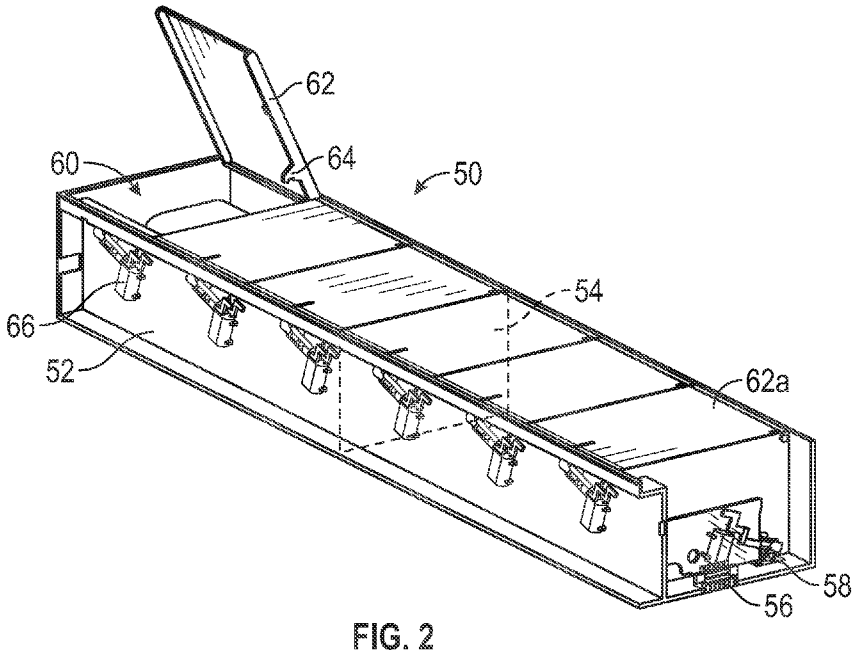
FIG. 2 depicts an exemplary SIA sub-drawer according to certain aspects of the present disclosure.
Figure 4:
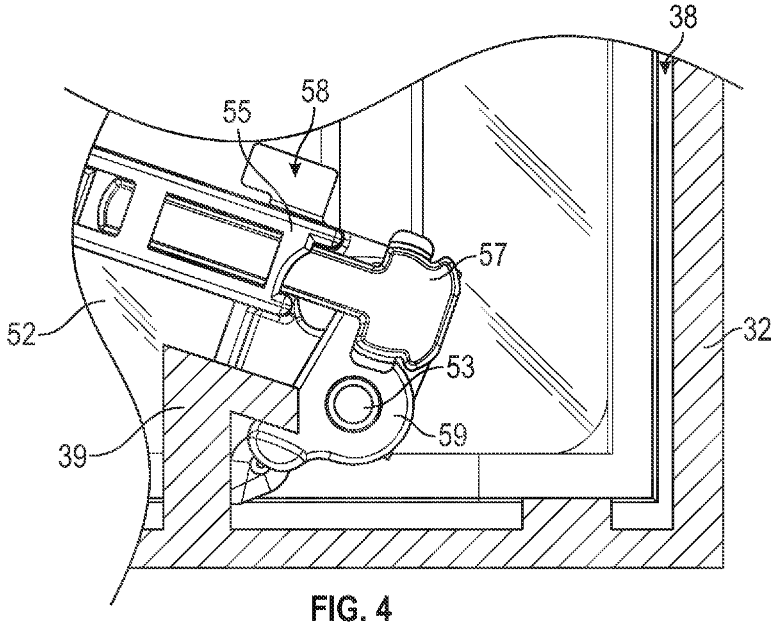
FIG. 4 is an enlarged view of the sub-drawer latch of a SIA sub-drawer loaded into a containment pocket of a DC according to certain aspects of the present disclosure.

FIG. 2 depicts an exemplary sub-drawer 50 according to certain aspects of the present disclosure. The sub-drawer 50 has a body 52 with at least one compartment 60. In certain embodiments, the body comprises at least one fixed internal wall 54 that divides the body 52 into a plurality of compartments 60. The fixed nature of the walls 54 reduces the likelihood of a user having access to one compartment 60 gaining access to another compartment 60. The sub-drawer 50 also has at least one lid 62 coupled to the body 52 so as to respectively cover and enclose the compartment 60. In certain embodiments, the sub-drawer 50 comprises a plurality of lids 62 configured to respectively cover and enclose the plurality of compartments 60. In certain embodiments, the lids 62 are hinged as shown in FIG. 2. Each lid 62 has a closed position, shown in FIG. 2 by the position of lid 62A, and, in certain embodiments, a lid hook 64. The sub-drawer 50 also includes a lid latch 66 coupled to the body 50 and configured to secure the lid in the closed position. In certain embodiments, the sub-drawer 50 comprises a plurality of lid latches 66 configured to respectively engage the lid hook 64 of one of the plurality of lids 62 when the lid 62 is in the closed position. In certain embodiments, the lid latch 66 comprises a muscle wire. In certain embodiments, the lid latch 66 comprises a motor (not visible in FIG. 2). A sub-drawer latch 58 is coupled to the body 50 and configured to engage a retention hook (not shown in FIG. 2) of an external system, for example a drawer such as shown in FIG. 4. When actuated, each lid latch 66 releases the respective lid hook 64. Likewise, the sub-drawer latch 58 releases the retention hook when actuated. In certain embodiments, the sub-drawer 50 includes an electrical connector 56 mounted to the body 52 and configured to detachably mate with an external connector (not shown in FIG. 2). Details of the active elements of sub-drawer 50 are discussed with respect to FIG. 4. In certain embodiments, the lid 62 is translucent or transparent so that a user can determine whether the compartment 60 contains items. In certain embodiments, the lid 62 is opaque which can reduce the temptation to break into the compartment. In certain embodiments, the lid 62 is configured to "pop open" when the lid 62 is released.

Figure 3:
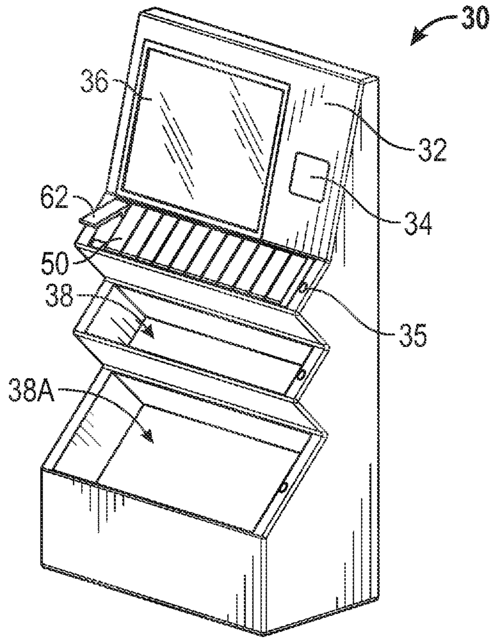
FIG. 3 depicts an exemplary DC according to certain aspects of the present disclosure.

FIG. 3 depicts an exemplary DC 30 according to certain aspects of the present disclosure. The DC 30 includes a housing 32 with at least one containment pocket 38. In certain embodiments, each containment pocket 38 has at least one retention hook (not visible in FIG. 3). The containment pockets 38 may be provided in a variety of sizes, and FIG. 3 shows a larger containment pocket 38A suitable for receiving a larger SIA sub-drawer 50. Details of the active elements of DC 30 are discussed with respect to FIG. 5.

An example SIA sub-drawer 50 is shown loaded and latched into one of the containment pockets of the DC 30. It can be seen that the SIA sub-drawer 50 remains accessible and the individual lids 62 can open to provide access to the respective compartment 60 while the SIA sub-drawer 50 is disposed in the containment pocket 38. In certain embodiments, the DC 30 includes one or more visual indicators 35, e.g. an LED light, a notification on the display 36, or the lid 62 "popping up," to indicate to the user that the lid 62 is unlatched. In certain embodiments, the DC 30 includes one or more visual indicators 35, e.g. an LED light, a notification on the display 36, or the SIA sub-drawer 50 "popping up," to indicate to the user that the SIA sub-drawer 50 is unlatched.

In certain embodiments, multiple lids 62 are opened simultaneously to provide all of the medications required for administration at a standard time, for example the 8 a.m. rounds. In certain embodiments, a first compartment contains a first medication and a second compartment contains a second medication that is to be administered with the first medication, and so a request to dispense the first medication results in the lids 62 of both compartments 60 opening and a message being provided on the display 36 to remind the nurse to remove and administer both medications.

FIG. 4 is an enlarged view of the sub-drawer latch 58 of a SIA sub-drawer 50 loaded into a containment pocket 38 of a DC 30 according to certain aspects of the present disclosure. A portion of the housing 32 and a portion of the body 52 have been cut away to reveal the sub-drawer latch 58 and associated elements. There is a retention hook 39 attached to the bottom of the containment pocket 38. In this example embodiment, the sub-drawer latch 58 includes a sliding member 57 captured in a guide 55 and coupled to a motor (not visible in FIG. 4) that is part of the sub-drawer latch 58. The sliding member 57 is coupled to a rotating member 59 that pivots about pin 53. When the sliding member 57 is extended, as shown in FIG. 4, the rotating member engages the retention hook 39 and thus prevents the sub-drawer 50 from being removed from containment pocket 38. When the sliding member 57 retracts, i.e. moves upward and to the left in the view of FIG. 4, the rotating member 59 rotates counterclockwise and disengages with the retention hook 39, thereby allowing the sub-drawer 50 to be removed from the containment pocket 38.

Figure 5:
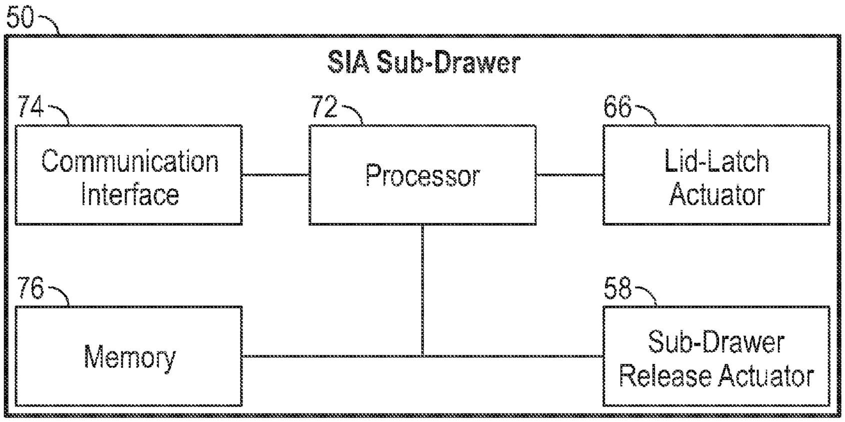
FIG. 5 is a block diagram of certain active elements of an embodiment of the SIA sub-drawer according to certain aspects of the present disclosure.

FIG. 5 is a block diagram of certain active elements of an embodiment of the SIA sub-drawer 50 according to certain aspects of the present disclosure. The sub-drawer 50 includes a processor 72 coupled to a memory 76, a communication interface 74, the lid actuators 66, and the sub-drawer actuator 58. In certain embodiments, the processor 72 is configured to receive signals from an external device through the communication interface 74. These signals may include one or more of a lid-release signal and a sub-drawer release signal. In certain embodiments, the processor 72 is further configured to cause a selectable one of the plurality of lid latches 66 to release the respective lid hook 64 upon receipt of a lid-release signal. In certain embodiments, the processor 72 is further configured to cause the sub-drawer latch 58 to release the retention hook 39 upon receipt of a sub-drawer release signal.

In certain embodiments, the processor 72 is configured to accept signals comprising information comprising at least one of an identification of a patient, an identification of a medication, a dosage of a medication, and an expiration date of a medication from an external device through the communication interface 74. The processor will store the accepted information in the memory 76. In certain embodiments, this information is retrieved from the memory 76 by the processor 72 and provided to the external device through the communication interface 74.

Figure 6:
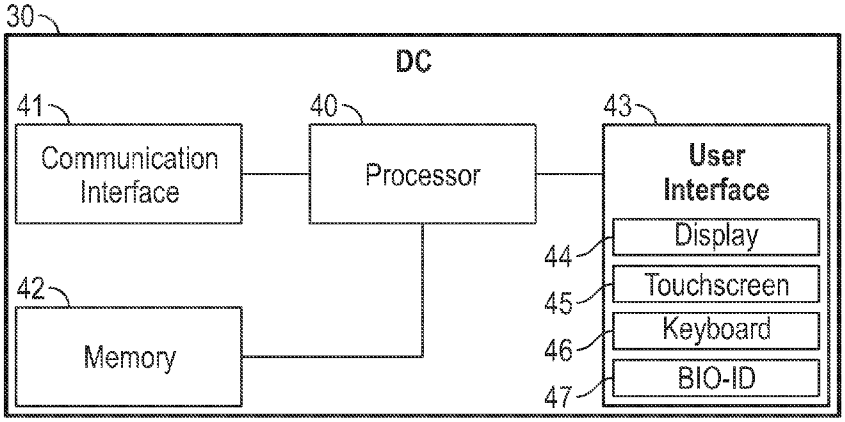
FIG. 6 is a block diagram of certain active elements of an embodiment of the DC according to certain aspects of the present disclosure.

FIG. 6 is a block diagram of certain active elements of an embodiment of the DC 30 according to certain aspects of the present disclosure. The DC 30 includes a processor 40 coupled to a memory 42, a communication interface 41, and a user interface 43. In certain embodiments, the user interface 43 includes a display 44 and a keyboard 46. In certain embodiments, the user interface 43 includes a touchscreen 45. In certain embodiments, the user interface 43 includes a biometric scanner, such as a fingerprint reader, referred to herein as a "bio-ID" 47. In certain embodiments, the user interface 43 is configured to accept input from a user that may include one or more of a user identification, a password, a biometric scan image, a request for a dose of a medication to be removed from the SIA sub-drawer 50, a request for access to one of the compartments 60 of the SIA sub-drawer 50, and a request to remove the SIA sub-drawer 50 from the DC 30.

In certain embodiments, the memory 42 contains information that includes the authorization required to access the contents of each compartment of an SIA sub-drawer 50 that is loaded into the DC 30 and the authorization level of each of a group of users. The processor 40 is configured to accept an identification of a user that is requesting a medication contained in one of the compartments 60, retrieve from the memory 42 the information about the authorization required to access the medication and the authorization level of the requesting user, compare the authorization required to access the medication and the authorization level of the user that is requesting the medication and determining if the medication should be dispensed to this user. If the determination is that the medication should be dispensed, the processor 40 is configured to provide the appropriate lid-release signal to the SIA sub-drawer 50 to cause the proper lid 62 to open and allow the user access to the requested medication. If the determination is that the medication should not be dispensed to this user, the processor 40 is configured to convey an error message to the user through the user interface 43. In certain embodiments, this is accomplished by displaying an error message on the display 44.

In certain embodiments, the memory 42 contains information that includes the authorization required to release the SIA sub-drawer 50 that is loaded into the DC 30 and the authorization level of each of a group of users. The processor 40 is configured to accept an identification of a user that is requesting release the SIA sub-drawer 50, retrieve from the memory 42 the information about the authorization required to release the SIA sub-drawer 50 and the authorization level of the requesting user, compare the authorization required to access the medication and the authorization level of the user that is requesting the medication and determine whether the medication should be dispensed to this user. If the determination is that the SIA sub-drawer 50 should be released, the processor 40 is configured to provide the appropriate sub-drawer release signal to the SIA sub-drawer 50 to cause the sub-drawer actuator 58 to release the retention hook 39 and allow the user to remove the SIA sub-drawer 50. If the determination is that the SIA sub-drawer 50 should not be removed by this user, the processor 40 is configured to convey an error message to the user through the user interface 43. In certain embodiments, this is accomplished by displaying an error message on the display 44.

Figure 7:
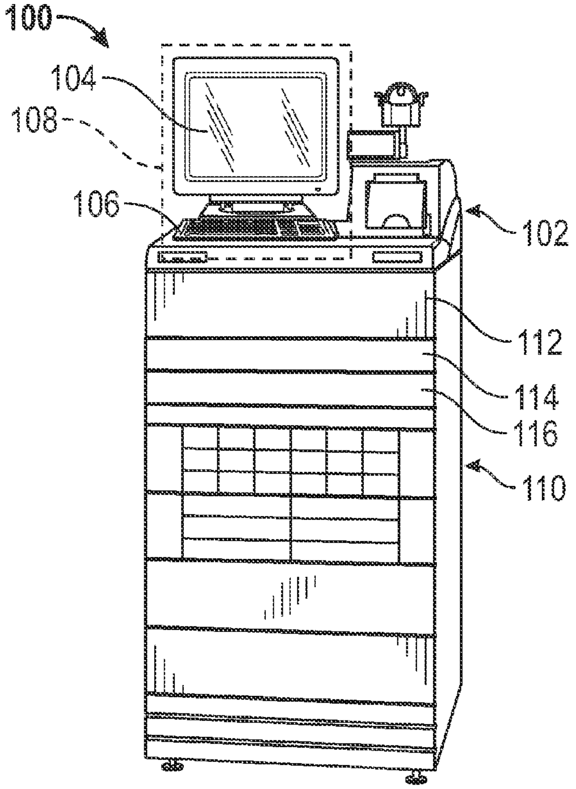
FIG. 7 depicts an ADM configured to accept SIA sub-drawers according to certain aspects of the present disclosure.

FIG. 7 depicts an ADM 100 configured to accept sub-drawers 50 according to certain aspects of the present disclosure. The ADM 100 has a control top 102 and a cabinet 110. The control top 102 includes a user interface 108 that, in certain embodiments, includes a display 104 and a keyboard 106. The cabinet 110 is configured to accept multiple types of drawers. In certain embodiments, a drawer 112 that is configured to accept full-height embodiments of SIA sub-drawer 50 is installed in the cabinet 110. In certain embodiments, drawers 114 and 116 that are configured to accept half-height embodiments of SIA sub-drawer 50 are installed in the cabinet 110. In certain embodiments, other types of drawers are also installed in the cabinet 110.

Figure 8:
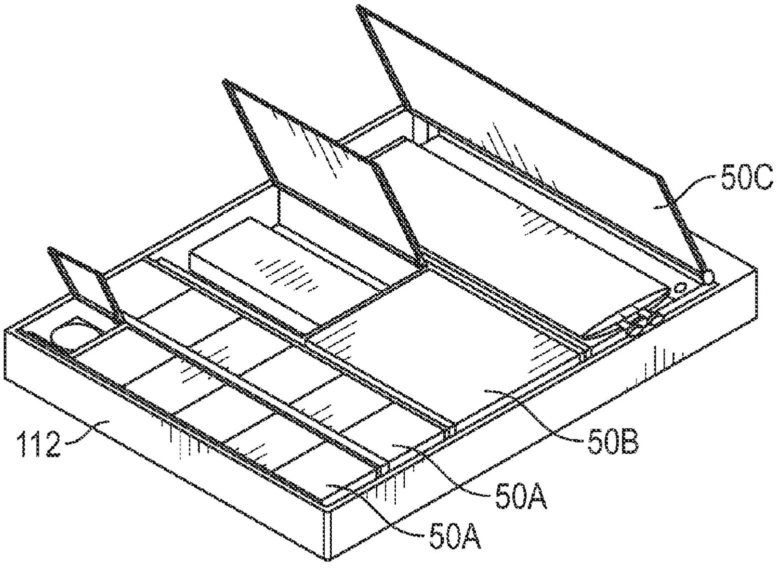
FIG. 8 depicts an exemplary ADM drawer configured to accept full-height embodiments of SIA sub-drawers according to certain aspects of the present disclosure.

FIG. 8 depicts an exemplary ADM drawer 112 configured to accept full-height embodiments of SIA sub-drawers 50 according to certain aspects of the present disclosure. In this example, the drawer 112 has two 6×1 SIA sub-drawers 50A, a 2×2 SIA sub-drawer 50B, and a 2×1 SIA sub-drawer 50C loaded. In certain embodiments, the drawer 12 is configured to accept any type of SIA sub-drawer in any position. For example, the drawer 112 of FIG. 8 is configured with six rows of six positions. The "2×" configurations 50B, 50C of the SIA sub-drawers 50 could be placed in any two open adjacent rows. In certain embodiments, the drawer 112 provides a retention hook and an electrical connector for connection to connector 56 at every possible position that an SIA sub-drawer 50 of any configuration might be loaded.

Figure 9:
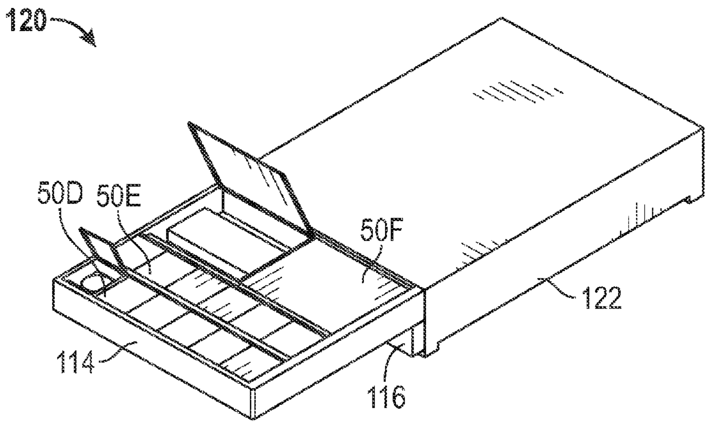
FIG. 9 depicts an ADM drawer module having multiple drawers according to certain aspects of the present disclosure.

FIG. 9 depicts a drawer module 120 having multiple drawers 114, 116 according to certain aspects of the present disclosure. The drawer module 120 is adapted to allow installation of half-height drawers 114, 116 in a cabinet 110 that is configured to accept only full-height drawers. The drawer module 120 has a full-height chassis 122 that is externally configured to be installed in the cabinet 110 and internally configured to accept the half-height drawers 114, 116. In this example, drawer 114 is configured to accept half-height embodiments 50D, 50E, and 50F of SIA sub-drawers 50. Drawer 116 may be configured to accept half-height SIA sub-drawers 50D, 50E, and 50F or may be a different type of drawer.

Figure 10:
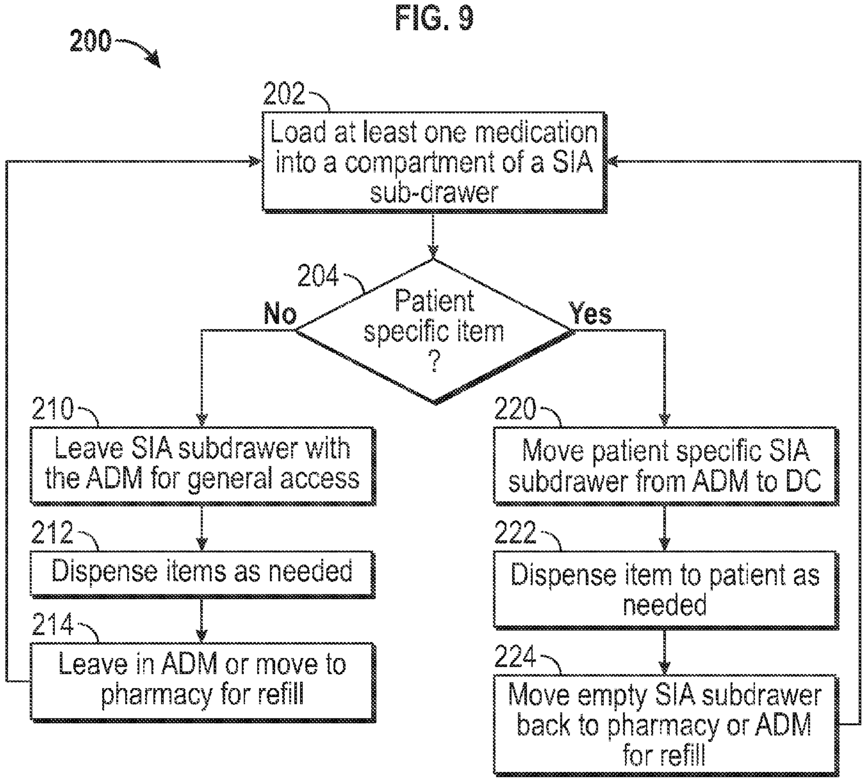
FIG. 10 is a flow chart of an exemplary process of providing medications to a patient according to certain aspects of the present disclosure.

FIG. 10 is a flow chart 200 of an exemplary process of providing medications to a patient according to certain aspects of the present disclosure. The process starts in step 202 with loading at least one dose of at least one medication into the compartments 60 of a SIA sub-drawer 50 while the SIA sub-drawer 50 is docked in a loading station. In certain embodiments, this loading of medications is accomplished in the pharmacy. In certain embodiments, this loading of medications is accomplished at a central pharmacy, a supplier facility, or other off-site location. In certain embodiments, only a single dose of a medication is loaded into any compartment 60. In certain embodiments, multiple doses are loaded into one or more compartments 60.

In step 204, the process branches depending on whether the SIA sub-drawer 50 was loaded in step 202 for a specific patient or a general-coverage device. If the SIA sub-drawer 50 is configured for a single patient, the process branches along the 'yes' path to step 220 wherein the patient-specific SIA sub-drawer 50 is moved to a DC 30 located in or near the room assigned to the patient. Once loaded into the DC 30, the medications contained in the SIA sub-drawer 50 are available to be removed, i.e. dispensed, as shown in step 222 and administered to the patient. Once all the medications have been removed from the SIA sub-drawer 50, the process moves to step 224 wherein the empty SIA sub-drawer 50 is released from the DC 30 and moved back to the pharmacy for re-use.

If the SIA sub-drawer 50 has been filled with medications to cover a plurality of patients, the process branches from step 204 along the 'no' path to step 210, wherein the SIA sub-drawer 50 is moved to an ADM and loaded into a drawer 112 that is configured to accept this embodiment of an SIA sub-drawer 50. In step 212, users request medications that are contained in one of the compartments 60 of the SIA sub-drawer 50 and the ADM sends the appropriate lid-release signal to the SIA sub-drawer that causes the proper lid 62 to open and allow the user access to the compartment that contains the requested medication. Once all the medications have been removed from the SIA sub-drawer 50, the process moves to step 214 wherein either a pharmacist or pharmacy technician reloads the empty SIA sub-drawer 50 in place in the ADM 100 or the SIA sub-drawer 50 is released from the DC 30 and moved back to the pharmacy for re-use.

The disclosed examples of a SIA sub-drawer illustrate the construction of a multi-compartment controlled-access device configured to securely transport medications between the pharmacy and a DC located in or near a room assigned to a patient. There is a significant time savings in eliminating the repeated back-and-forth trips between the patient's location and the nearest ADM to remove medications. The provision of multiple separately accessible compartments enables the system to be configured to securely allow access to only a single dose of medication at a time, thereby eliminating the need to count the items in a compartment when removing an item as well as reducing the risk of a user removing more doses than prescribed for a patient.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims.

Reference to an element in the singular is not intended to mean "one and only one" unless specifically so stated, but rather "one or more." Use of the articles "a" and "an" is to be interpreted as equivalent to the phrase "at least one." Unless specifically stated otherwise, the term "some" refers to one or more.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "operation for."

Although embodiments of the present disclosure have been described and illustrated in detail, it is to be clearly understood that the same is by way of illustration and example only and is not to be taken by way of limitation, the scope of the present invention being limited only by the terms of the appended claims.

What is claimed is:

1. A single-item access (SIA) sub-drawer comprising:
- a body comprising a compartment;
- a lid coupled to the body, the lid selectably securable in a closed position that encloses the compartment;

- a lid latch coupled to the body and configured to secure the lid;
- a sub-drawer latch carried by the body and configured to secure and detach the body to a base by rotating the sub-drawer latch to engage and selectably release a retention hook of the base; and
- a processor carried by the body and coupled to the lid latch and the sub-drawer latch, the processor configured to cause the sub-drawer latch to release the retention hook upon receipt of a sub-drawer release signal.

2. The SIA sub-drawer of claim 1, wherein:
- the body comprises a plurality of compartments;
- the SIA sub-drawer further comprises a plurality of lids and a plurality of lid latches that are configured to secure and selectably release the respective lid;
- the processor is coupled to the plurality of lid latches and configured to cause a selectable one of the plurality of lid latches to release the respective lid upon receipt of a lid-release signal.

3. The SIA sub-drawer of claim 1, further comprising a communication interface coupled to the processor, wherein the processor is configured to receive the signals from an external device through the communication interface.

4. The SIA sub-drawer of claim 3, further comprising a memory coupled to the processor, wherein the processor is configured to accept information from the external device, the information comprising at least one of an identification of a patient, an identification of a medication, and a dosage of a medication, and store the accepted information in the memory.

5. The SIA sub-drawer of claim 3, wherein the communication interface comprises an electrical connector configured to detachably mate with an external connector.

6. The SIA sub-drawer of claim 3, wherein the communication interface comprises a wireless transceiver.

7. A point-of-care (POC) system comprising:
- a dispensing cabinet (DC) comprising:
  - a housing comprising a containment pocket and a retention hook; and
  - a first processor disposed within the housing; and
- a single-item access (SIA) sub-drawer comprising:
  - a body configured to be secured within the containment pocket, the body comprising a compartment;
  - a lid coupled to the body, the lid selectably securable in a closed position that encloses the compartment;
  - a lid latch coupled to the body and configured to secure the lid;
  - a sub-drawer latch carried by the body and configured to secure and detach the body to the housing by rotating the sub-drawer latch to engage and selectably release the retention hook; and
  - a second processor on the body and coupled to the lid latch and the sub-drawer latch, the second processor configured to cause the sub-drawer latch to release the retention hook upon receipt of a sub-drawer release signal from the first processor.

8. The POC system of claim 7, wherein:
- the body comprises a plurality of compartments;
- the SIA sub-drawer further comprises a plurality of lids and a plurality of lid latches that are configured to secure and selectably release the respective lid;
- the processor is coupled to the plurality of lid latches and configured to cause a selectable one of the plurality of lid latches to release the respective lid upon receipt of a lid-release signal.

9. The POC system of claim 7, wherein:

the DC further comprises a user interface and a memory containing information about the contents of the sub-drawer;

the first processor is coupled to the user interface and the memory; and the first processor is further configured to receive user input through the user interface and to provide the lid-release signal to the second processor if the user input includes a request for an item disposed within the sub-drawer.

10. The POC system of claim 9, wherein:

the memory further comprises information about the authorization required to access the contents of each compartment and about the authorization level of each user; and the processor is configured to retrieve the information about the authorization required to access the contents of each compartment and about the authorization level of each user from the memory, compare the authorization required to access the contents of each compartment and the authorization level of each user that is requesting access, and determine if access should be granted;

the processor is further configured to provide a lid-release signal to the second processor if it is determined that access should be granted; and the processor is further configured to not provide a lid-release signal to the second processor if it is determined that access should not be granted.

11. The POC system of claim 9, wherein:

the memory further comprises information about the authorization required to release the sub-drawer and about the authorization level of each user; and the processor is configured to retrieve the information about the authorization required to release the sub-drawer and about the authorization level of each user from the memory, compare the authorization required to release the sub-drawer and the authorization level of each user that is requesting the release, and determine if the sub-drawer should be released;

the processor is further configured to provide a sub-drawer release signal to the second processor if it is determined that the sub-drawer should be released; and the processor is further configured to not provide a sub-drawer release signal to the second processor if it is determined that the sub-drawer should not be released.

12. The POC system of claim 7, wherein the containment pocket and SIA sub-drawer are configured such that the lids of the SIA sub-drawer remain accessible when the SIA sub-drawer is secured in the containment pocket.

13. The POC system of claim 7, wherein the SIA sub-drawer further comprises a communication interface coupled to the processor, wherein the processor is configured to receive the signals from the first processor through the communication interface.

14. The POC system of claim 7, wherein the DC is configured to be mounted on a wall.

15. A method of providing patient-specific medications, the method comprising the steps of:

docking a single-item access (SIA) sub-drawer onto a loading station, the SIA sub-drawer comprising a body comprising a compartment, a lid coupled to the body and selectably securable in a closed position that encloses the compartment, a lid latch coupled to the body and configured to secure the lid, a sub-drawer latch carried by the body and configured to engage and selectably release a retention hook, and a processor carried by the body and coupled to the lid latch and the sub-drawer latch wherein the processor is configured to cause the lid latch to release lid upon receipt of a lid release signal;

providing a lid-release signal to the processor to thereby release the lid and thereby allow access to the compartment;

loading at least one dose of a medication prescribed for a specified patient into the compartment;

closing the lid;

removing the SIA sub-drawer from the loading station;

transporting the SIA sub-drawer to a dispensing cabinet (DC) that is located at a point-of-care (POC) for the specified patient, the DC having a containment pocket and a retention hook; and securing the SIA sub-drawer in the containment pocket by rotating the sub-drawer latch to engage the retention hook of the DC.

16. The method of claim 15, further comprising the steps of:

requesting a dose of the medication through a user interface of the DC to thereby cause the DC to provide a lid-release signal to the processor of the SIA sub-drawer to thereby cause a lid-latch actuator to release the lid and allow access to the medication;

removing the requested dose of medication from the compartment; and administering the requested medication to the patient.

17. The method of claim 16, further comprising the steps of:

accepting an identification of a user that is requesting the medication;

retrieving automatically from a memory in the DC information about the authorization required to dispense the medication and about the authorization level of the user;

comparing automatically the authorization required to dispense the medication and the authorization level of the user that is requesting the medication and determining if the medication should be dispensed; and providing automatically a lid-release signal to the SIA sub-drawer only if it is determined that the medication should be dispensed.

18. The method of claim 15, further comprising the steps of:

requesting the release of the SIA sub-drawer from the DC through a user interface of the DC to thereby cause the DC to provide a sub-drawer-release signal to the processor of the SIA sub-drawer to thereby cause the sub-drawer actuator to release the retention hook; and removing the sub-drawer from the containment pocket.

19. The method of claim 18, further comprising the steps of:

accepting an identification of a user that is requesting the release;

retrieving automatically from a memory in the DC information about the authorization required to release the SIA sub-drawer and about the authorization level of the user;

comparing automatically the authorization required to release the SIA sub-drawer and the authorization level of the user that is requesting release of the SIA sub-drawer and determining if the SIA sub-drawer should be released; and providing automatically a sub-drawer release signal to the processor only if it is determined that the SIA sub-drawer should be released.

* * * * *